United States Patent
Chellis et al.

(10) Patent No.: US 7,257,635 B2
(45) Date of Patent: Aug. 14, 2007

(54) SYSTEM AND METHOD FOR DESCRIBING AND AUTOMATICALLY MANAGING RESOURCES

(75) Inventors: Eugene C. Chellis, Seattle, WA (US); William G. Burton, Bothell, WA (US); Christopher VandenBerg, Woodinville, WA (US); Siva Mohan, Bothell, WA (US); Arun K. Sacheti, Redmond, WA (US); Justin Cole, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/079,422

(22) Filed: Mar. 14, 2005

(65) Prior Publication Data

US 2005/0193115 A1    Sep. 1, 2005

Related U.S. Application Data

(63) Continuation of application No. 09/796,284, filed on Feb. 28, 2001, now Pat. No. 6,901,446.

(51) Int. Cl.
G06F 12/00 (2006.01)
G06F 13/00 (2006.01)

(52) U.S. Cl. ..................................... 709/226
(58) Field of Classification Search ............... 709/226, 709/102, 302; 712/220
See application file for complete search history.

(56) References Cited

U.S. PATENT DOCUMENTS

| | | | |
|---|---|---|---|
| 5,548,506 A | | 8/1996 | Srinivasan |
| 5,675,767 A * | | 10/1997 | Baird et al. .................. 711/156 |
| 5,784,646 A * | | 7/1998 | Sawada ........................ 710/38 |
| 5,857,190 A | | 1/1999 | Brown |
| 6,480,861 B1 | | 11/2002 | Kanevsky et al. |
| 6,584,493 B1 | | 6/2003 | Butler |
| 6,697,858 B1 | | 2/2004 | Ezerzer et al. |
| 6,771,661 B1 | | 8/2004 | Chawla et al. |
| 6,775,792 B2 * | | 8/2004 | Ulrich et al. ................... 714/6 |
| 6,799,208 B1 | | 9/2004 | Sankaranarayan et al. |
| RE38,633 E | | 10/2004 | Srinivasan |
| 6,977,927 B1 * | | 12/2005 | Bates et al. .................. 370/381 |

OTHER PUBLICATIONS

Sheehan KB (REPRINT), et al., "Flaming Complaining, Abstaining: How Online Users Respond to Privacy Concerns", Journal of Advertising, 1999, p. 37-51, vol. 28, No. 3.
Sophie-Julie Pelletier, et al., "ISAME: Une Architecture Multi-Agent De Recherche D'Information", INFOR, May 2000, p. 65-92, vol. 38, No. 2.

* cited by examiner

Primary Examiner—David Y. Eng
(74) Attorney, Agent, or Firm—Amin, Turocy, & Calvin, LLP

(57) ABSTRACT

A system and method for automatically allocating resources is provided. The system includes one or more components for automatically allocating one or more resources, based at least in part on data associated with the one or more resources, the data including at least one of, type data, instance data, characteristic data, and dynamically modifiable metadata. An alternative aspect of the system provides one or more components for automatically allocating one or more resources distributed on a plurality of resource allocation servers. The one or more components for automatically allocating the one or more resources can improve utilization of the capacity of the one or more resources. In an alternative embodiment the system includes an Application Programming Interface (API) operable to configure and/or control the one or more components for automatically allocating one or more resources.

20 Claims, 14 Drawing Sheets

SYSTEM AND METHOD FOR DESCRIBING AND AUTOMATICALLY MANAGING RESOURCES

REFERENCE TO RELATED APPLICATIONS

This is a continuation application of U.S. patent application Ser. No. 09/796,284, entitled "SYSTEM AND METHOD FOR DESCRIBING AND AUTOMATICALLY MANAGING RESOURCES", filed Feb. 28, 2001 now U.S. Pat. No. 6,901,446. This application is also related to co-pending U.S. patent application Ser. No. 10/984,387 entitled "SYSTEM AND METHOD FOR DESCRIBING AND AUTOMATICALLY MANAGING RESOURCES" filed on Nov. 9, 2004. The entireties of the above-noted applications are incorporated herein by reference.

TECHNICAL FIELD

The present invention relates generally to computer programming and more particularly to a system and method for describing and automatically and dynamically allocating and managing resources.

BACKGROUND OF THE INVENTION

As more applications and services (hereinafter "services") have become commonly available over the World Wide Web portion of the Internet (the "Web"), the number, type and complexity of resources required to support access to such services have increased. In addition, the complexity of the relationships between such resources, and the complexity of the algorithms employed to allocate such resources has increased.

Many web-based services require service consumers to register for access to a service. Such registering requires that resources be allocated to such registering consumers. Registering the increasing numbers of consumers has become more difficult because of factors including, but not limited to, the number, type, sophistication and complexity of relationships between the resources required to support such consumers coupled with the volume of consumers registering for services, the rate at which new consumers are registering for services and the volume of services available. Conventionally registering new consumers, which may include allocating one or more accounts for the new service consumers, may have required manual intervention (e.g., substituting/adding/removing resources, updating allocation algorithms, updating resource information). Such manual intervention can be time-consuming, complicated and expensive, producing resource allocation delays (and resulting registration delays) or allocation errors that negatively impact allocating resources. Consumers forced to wait for access to services may forego using the service, thus resulting in lost business for the service provider. Thus, automating consumer registration is required.

But automating consumer registration creates new problems. For example, due to the increasing number, type, complexity and relationships between resources, it has become increasingly difficult to efficiently allocate resources for consumers registering to use services available over the Web. Conventionally, allocating resources may have required a manual intervention, or the application of an allocation rule or allocation algorithm. Such interventions, allocation rules and algorithms may have required accessing information concerning resources. But the resource information, allocation rules and/or allocation algorithms may have been static, and unable to respond to the changing number, type, complexity and relationships between the resources to be allocated. The information, allocation rules and/or allocation algorithms may have become static because they were hard coded into data structures and/or programs that were inflexible and difficult to change, in some cases requiring rewriting programming code in order to change allocation algorithms.

Manual allocation and/or inflexible allocation rules may generate delays in resource allocation and/or wasteful resource allocation. For example, an allocation rule that dedicates a standard set of resources to a user registering for an application may over-allocate or under-allocate resources to that user. Such standard allocations may be artifacts of inflexible allocation rules and/or algorithms. By way of illustration, a first consumer registering for an email service may be allocated 10 Mb of disk space, but the first consumer may only undertake processing that consumes 1 Mb of disk space, thus leaving 9 Mb of disk space underutilized and/or over-allocated. The first consumer will likely not be negatively impacted by the over-allocation. But a second consumer may have 10 Mb of disk space allocated and may undertake processing that could consume 15 Mb of disk space if 15 Mb of disk space was available. The second consumer will likely be negatively impacted by both the over-allocation and the under-allocation, noticing slow and/or unsuccessful access to the service. Conventionally, adapting allocations to such consumers, if possible, may have required manual intervention. Further, adapting the allocation rules and/or algorithms employed to allocate resources to such users, if possible, may have similarly required manual intervention. Thus, such adaptations may have been foregone, resulting in inappropriate allocations and/or allocation algorithms.

Conventionally, resources for a service may have been allocated from a single logical resource. For example, all consumers of an email service may have had resources allocated by a single email resource allocation server. As the number, type, complexity and relationships between resources increases, and as the rate and volume of registering consumers increases, it becomes increasingly difficult to allocate resources from a single resource server. It has been difficult to coordinate allocating resources from multiple resource servers because of problems including, but not limited to, disparities in resource allocation algorithms, disparities in resource allocation rules, different resource descriptions and contention/timing problems.

The size and/or characteristics of services available over the Web can change, resulting in corresponding changes in resource allocation demands, which further increases complexity problems associated with resource allocation. Thus, even if a conventional allocation method was able to allocate resources for a service, it may not be able to allocate resources when the service changes size and/or characteristics (e.g., number and type of resources required) due to the increased allocation complexity.

Allocating resources to consumers is further complicated because the resources available to be allocated may change. By way of illustration, the number and type of resources available may grow or diminish at the same time that the characteristics of the resources are changing. Further, the relationships between resources to be allocated can also change. For example, at a first point in time, 100 disks of 100 Mb each may be available, but at a second point in time 75 disks of 350 Mb each may be available. Thus, static rules for resource allocation may become obsolete and lead to unsatisfactory resource allocation. While the changing numbers and characteristics of resources complicate resource allocation, adding additional services that require different allocation algorithms for the available resources can add even further complexity to resource allocation. Similarly, changing the resource mix required by a service can generate even more complexity.

Conventionally monitoring and reallocating resources, if performed at all, may have been accomplished manually and/or by inflexible programs. Thus, determining that a new resource was required, or that a new relationship between resources exists, or adapting to the new resource or relationship, if possible, may have required the manual intervention of a skilled resource allocator or the application of an outdated program. As the complexity of allocating resources to the ever-increasing number of services increases, such resource allocators can easily become overwhelmed by the volume and complexity of the resource allocation tasks and such programs can quickly produce inappropriate allocations.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a system and method for describing and managing resources, and for automatically and dynamically allocating such resources to consumers. It is to be appreciated that a consumer can be, but is not limited to being, a user, an application, a process, a thread, an object and a service. Such an automated and dynamic allocation service can allocate resources from pools of resources available for allocation. The resources may be described by metadata and may be allocated by one or more algorithms. Since an ever-increasing number of consumers require resources, and since the resources may change in number, type, complexity and dependency on other resources, attempting to have one computer manage such resource allocation may produce unsatisfactory results (e.g. lengthy delays, unsuccessful allocation attempts). Thus, in one exemplary aspect of the present invention, allocating resources may be distributed between two or more cooperating components.

The present invention includes initially defining resource requirements for a service. The operation of the present invention includes the ability to redefine resource requirements, allocation rules and algorithms to more efficiently utilize resources available to be allocated. The resources to be allocated can change in numbers, characteristics and types. Further, the mix of resources required for an application and/or service can change. Thus, the present invention provides a system and method for defining resources, for manipulating the pool of resources available (e.g., adding/subtracting resources dynamically based on usage), for tracking the resources available and for defining and managing dependency relationships between applications, sessions and/or resources. By way of illustration, a new resource type can be created, with the creation including recording information concerning the new resource type (e.g., disk capacity, disk speed, number of concurrent users). Similarly, an existing resource can have its characteristics change (e.g., bandwidth increased/decreased, disk size increased/decreased). By way of further illustration, instances of a type can be added to the pool of resources available for allocation, and once added to the pool, the status (e.g., availability, online/offline, allocated/not-allocated) of the resource can be tracked.

Dependencies can exist between items including, but not limited to, services and resources. For example, a first consumer access to a first service may require allocating a first resource and a second resource, while a second consumer access to a second service may require allocating a first resource, a second resource and two instances of a third resource. Further, there may be dependencies between resources. For example, to allocate a first resource may require that a second resource and a third resource be available to be allocated. For example, a router resource may require that a data communication channel resource and a data security resource be available before the first resource can be allocated. In the present invention, a resource may be defined so that a service is a resource to another service. For example, a database lookup service may be a resource required by an email service and a chat room service.

The data concerning resources can include data (in the form of properties and/or attributes about the resource and metadata (data about data)). The data concerning a resource can include type and relationship data. For example, a resource can be generally characterized by data including, but not limited to, its name, capacity in units relevant to the resource (e.g. megabytes, CPU cycles or transactions per second), operating characteristics, relationships with other resources, and dependencies on other resources. An instance of a resource may be more particularly characterized by data including, but not limited to, its allocation status, its availability, and its current allocation to services and/or resources. The metadata concerning a resource can include data about how to define a resource. For example, a resource definition may require registering N fields, (N being an integer), where a first field requires a string of M characters, (M being an integer), the characters corresponding to a resource name, where the second field requires a thirty-two bit globally unique identifier (GUID), and so on.

To facilitate allocating resources to consumers, the present invention can notice resource allocation initiating events, which include accepting allocation requests, and producing responses to such requests by examining, for example, a dependency tree and one or more resource instance tables. For example, when a consumer seeks to automatically register for a service, the service may request an allocation of a set of resources. The present invention can determine whether the request can be processed by determining which resources are required, (e.g., by examining a dependency tree) and by determining whether such resources are available (e.g., by examining a resource instance table). If the resources are available, the present invention can allocate the resources, inform the requestor of the allocation and the identification of the resources, and update the resource instance table to reflect such allocation. If the resources are not available, then the present invention may deny the allocation request, and may undertake additional processing to resolve the resource availability problem and/or the present invention may determine whether the allocation request can be honored, even though one or more resources are unavailable (e.g., such as a resource that is used by many services for brief periods of time, and for which services can wait). To further facilitate allocating resources to users, the present invention can also maintain allocation rules and/or algorithms for resource types. For example, the allocation rules can include, but are not limited to, numerical balancing across resource instances and grouping optimization algorithms. These rules can take into account actual usage of resources when determining resource requirements.

To facilitate managing the resource definition and allocation aspects of the present invention, queries can be processed and reports can be generated concerning the resources, the data associated with the resources and the metadata associated with the resources.

To facilitate managing the pool of resources and allocation thereof, feedback can be provided to allow real-time and/or offline adaptation of components including, but not limited to, resource allocation algorithms, data, and/or metadata. By way of illustration, feedback data may indicate that a first user has been allocated 100 Mb of space, but has only ever used 3 Mb of space. Thus the expected utilization ratio of allocated resources to available resources for the resource with which the first user's 100 Mb is associated can be updated based on the first user's contribution to the aggregate usage levels of that resource. Then, based on adjustable rules, a new level of allocation for the resource with which the first user allocation is associated may be generated. For example, if the resource has 1,000 Mb space available to be allocated, which is allocated in 100 Mb blocks, then it would appear that only 10 consumers could be allocated space from that resource. But given feedback like that for the first user (e.g., averages 3 Mb space usage), it may be safe to over allocate the first resource based on the aggregate typical and maximum usage fed back to the present invention, thus providing advantages over conventional, static systems.

To further facilitate managing the pool of resources and the allocation thereof, a resource discovery component can update one or more components of the present invention with information concerning new resources that are discovered. For example, a server may come online, advertise its presence to one or more networks, and be noticed by the present invention. The present invention may then automatically adjust stored data and/or its allocation rules and/or algorithms to account for the availability of the additional resource. Such automatic updates are facilitated by the data-driven nature of the present invention, wherein updates to the resource instance table, resource type data and/or metadata can be employed to account for the availability of the new resource, thus providing advantages over conventional systems that may require recoding and/or other manual intervention to account for a new resource. When a new resource is discovered, the current allocation of resources may be examined, and requests to allocate and/or reallocate one or more resources may be generated by the present invention based on the availability of the new resource. For example, a new server with capacity to handle one hundred users (for ease of computation, simple, small numbers are employed in this example) may come online. Examining the current allocation of resources may indicate that ten servers, each capable of handling fifty users, are currently each handling in excess of forty-five users. The present invention can thus generate reallocation requests to migrate a number of users from one or more of the servers that are operating near capacity to the new server.

In accordance with an aspect of the present invention, a system for automatically and dynamically allocating resources is provided. The system includes components for automatically allocating resources, based at least in part, on data associated with the resources. The data includes at least one of type data, instance data and dynamically modifiable metadata. The system also includes components for storing data associated with the resources. The stored data includes at least one of type data, instance data and dynamically modifiable metadata.

Another aspect of the present invention provides a system for automatically and dynamically allocating resources further including a monitoring component for monitoring usage of the resources. The monitoring component can accept and/or produce feedback data concerning the usage of the one or more resources.

Another aspect of the present invention provides a system for automatically and dynamically allocating resources further including a component for discovering resources. The discovery component can produce discovery data when at least one of a new resource is discovered; the number of resources changes, and the type of one or more resources changes, occurs.

Still another aspect of the present invention provides a method for automatically and dynamically allocating resources. The method includes noticing a resource allocation initiating event and automatically allocating one or more resources. The resources that are the subject of the resource allocation request are associated with at least one of type data, instance data, characteristic data and resource metadata.

Still yet another aspect of the present invention provides a method for automatically and dynamically allocating resources further including identifying resource affinities, based at least in part on resource and consumer characteristics, locating one or more dependent resources by traversing one or more resource dependency trees, locating resource instances available to be allocated, selecting one or more located resource instances to allocate, marking the one or more resource instances to allocate and allocating the one or more located resource instances.

Still yet another aspect of the present invention provides a method for automatically and dynamically allocating resources further including monitoring the usage of the resources and receiving and/or producing feedback information concerning that usage.

Another aspect of the present invention provides a system for automatically and dynamically allocating one or more resources. The system includes means for receiving a resource allocation request, the request specifying one or more desired resources to be allocated, means for storing information concerning one or more resources available to be allocated, the information including at least one of type data, instance data, characteristic data and metadata, means for resolving one or more dependencies between the one or more available resources, means for resolving one or more affinities between the one or more available resources, means for selecting an algorithm to allocate the one or more available resources, means for selecting one or more chosen resources to allocate in response to the resource allocation requests, means for allocating one or more chosen resources in response to the resource allocation request and means for updating the information concerning the one or more available resources, the information including at least one of type data, instance data, characteristic data and metadata.

Another aspect of the present invention provides for dynamically changing a resource in an available pool of resources to be allocated. Changing the resource can include adding a new resource, updating an existing resource and removing a resource. Updating the resource can include changing its type, characteristics, relationships and dependencies with other resources and/or services.

Still yet another aspect of the present invention provides a data packet adapted to be transmitted between two or more computer processes. The data packet includes information concerning automatically allocating resources. The information includes at least one of type data, characteristic data, instance data and metadata.

Another aspect of the present invention provides a computer readable medium storing computer executable instructions operable to execute a method for automatically allocating resources. The method includes receiving a resource allocation request for resources, automatically allocating one or more resources to facilitate access of one or more applications in response to the resource allocation request, wherein the one or more resources are associated with at least one of type data, instance data, characteristic data and resource metadata, and replying to the resource allocation request.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
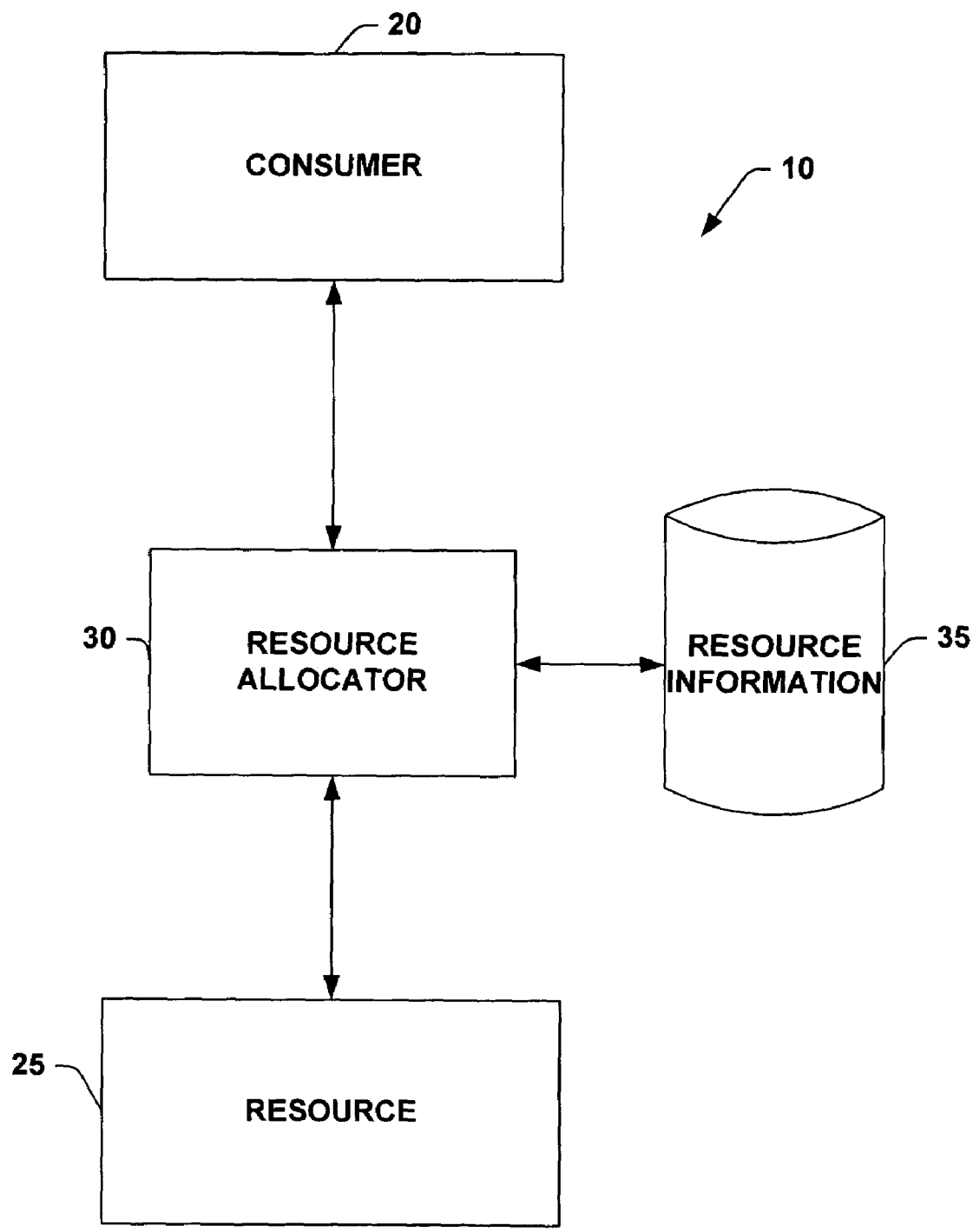
FIG. 1 is schematic block diagram illustrating a system for automatically and dynamically allocating resources, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

Referring initially to FIG. 1, a system 10 for automatically and dynamically allocating resources is illustrated. A consumer 20 can cause a request for a resource 25 to be sent to a resource allocator 30. The consumer 20 can be an entity including, but not limited to, an application, a process, a thread, a user, a machine and an object, for example. Although six example entities are provided in describing the consumer 20, it is to be appreciated that any suitable consuming process, system and/or apparatus may cause such a resource allocation request to be sent to the resource allocator 30. Although one method for initiating automatic and dynamic resource allocation is through presenting a request to the present invention, it is to be appreciated that other resource allocation initiating events may also trigger the resource allocation. By way of illustration, a process may store desired resource information in a record and generate an interrupt. An interrupt service routine may handle the interrupt and cause the present invention to allocate resources. By way of further illustration, a thread may set one or more bit flags indicating resource requirements and then generate a signal. A signal handler may, in handling the signal, initiate processing in the present invention.

The resource 25 can be an entity including, but not limited to, memory, processor time, communication bandwidth, network devices, disk space and display space, for example. Although six example entities are provided in describing the resource 25, it is to be appreciated that any suitable resource 25 may be automatically and dynamically allocated in accordance with the present invention. For example, a resource may be a service provided by a human, and/or machine and/or process and/or system and/or software. Accordingly, the inventors contemplate the present invention being applied to numerous types of resources, and intend for such applications to fall within the scope of the claims of this application. Thus, the resource 25 may also be an outcome (e.g., granting access to an email service, employing an authentication service), which in turn may require one or more resources to be allocated. The resource 25 may be allocated, in response to multiple requests, to more than one consumer, up to a pre-determined threshold, where the pre-determined threshold may be defined, for example, in the instance data and/or metadata. The resource 25 may be a portion of the capacity of a physical or logical device. The resource allocator 30 can determine whether the resource 25 is available to be allocated to the consumer, basing the determination, at least in part, on resource information 35. The resource allocator 30 can be an entity including, but not limited to, a stand-alone computer, a distributed computer, an application, a process and one or more threads of execution, for example. Although five example entities are provided in describing the resource allocator 30, it is to be appreciated that any suitable resource allocator 30 can be employed in accordance with the present invention.

Conventionally, the resource 25 may have been allocated by a single resource allocator 30. For example, users of an email service may have had mailbox resources (e.g., memory, communication device, processor) allocated by a single email resource server. But as the complexity of the resources 25 increases, as the complexity of relationships between the resources 25 increases, and as the complexity of algorithms for allocating the resource 25 increases, it becomes increasingly difficult to allocate the resource 25 from the single resource allocator 30. Thus, in an example aspect of the present invention, the resource allocator 30 may be one or more components that cooperate to allocate the resource 25. Conventionally, it has been difficult to coordinate allocating the resource 25 from multiple resource allocators 30, because of problems including, but not limited to, disparities in resource allocation algorithms, disparities in resource allocation rules, disparate resource descriptions and contention/timing problems caused by such disparities. Such disparities can be caused, at least in part, by the inflexibility of conventional systems (e.g., difficulty in updating resource information, difficulty in updating resource allocation algorithms). By providing co-operating components that can be distributed over one or more resource allocators 30, the present invention mitigates problems associated with such disparities.

The resource information 35 can include, but is not limited to, resource identifying data, resource characteristic data, instance data, and resource metadata, for example. The resource identifying data can include, but is not limited to, a resource name, and resource size, for example. The resource data can include, but is not limited to, resource capacity, resource speed, and resource bandwidth, for example. The resource instance data can include, but is not limited to, an instance identifier, instance availability status (e.g., whether resource is on or off line), capacity information (e.g., number of users supportable by a resource), allocation statistics (e.g., number of users allocated to resource), grouping information (e.g., sets of resources with which a resource can be allocated), and dependencies on other resources. Concerning the term "dependencies", a first resource is said to have a dependency on a second resource when in order to allocate the first resource the second resource must also be allocated. For example, a resource associated with network bandwidth may have a dependency on a data communication device. The dynamically modifiable metadata can include, but is not limited to, data concerning the instance data, data concerning the type data, dependency relationships between services and resources, dependency relationships between resources and resources, and constraint or preference information indicating affinity relationships. Providing the dynamically modifiable metadata facilitates describing a resource, thus mitigating problems associated with changing resources in conventional systems.

Figure 2:
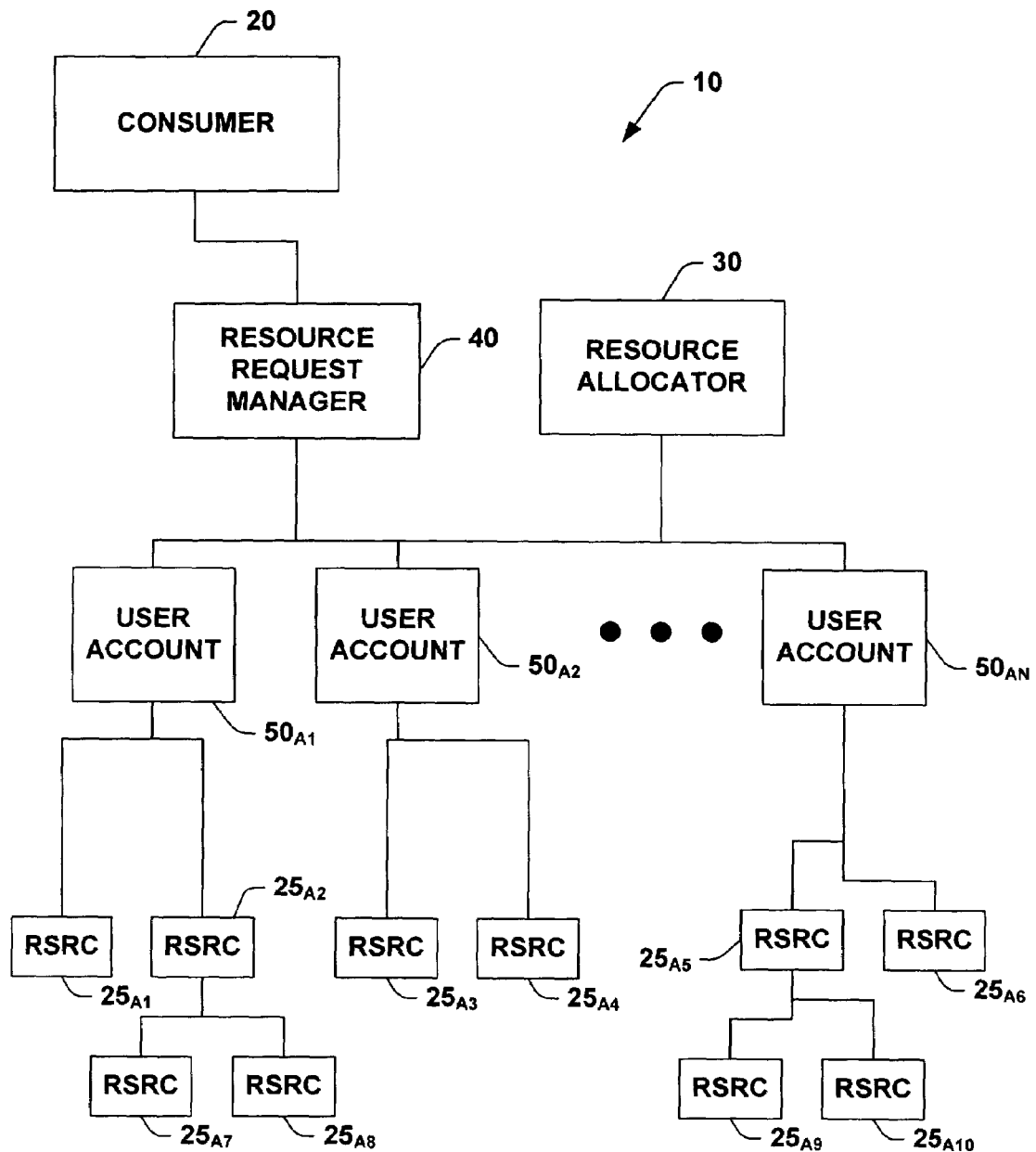
FIG. 2 is a schematic block diagram further illustrating a system for automatically and dynamically allocating resources, in accordance with an aspect of the present invention.

Turning now to FIG. 2, the system 10 for automatically and dynamically allocating resources is further illustrated. The consumer 20 may cause a resource allocation request to be sent to a resource request manager 40. The resource request manager 40 can pass the resource allocation request to the resource allocator 30, which will attempt to allocate the resources 25 required by the resource allocation request generated by the consumer 20, and resources 25 upon which the requested resources have dependencies. By way of illustration, the consumer 20 can cause a resource allocation request to be generated that is associated with having a user email account $50_{A1}$ created. The user email account $50_{A1}$ can be considered a resource that is to be allocated to the consumer 20. The present invention can determine that in order to allocate the user account $50_{A1}$ to the consumer 20, that other resources 25 are required. For example, the resources $25_{A1}$, $25_{A2}$, $25_{A7}$ and $25_{A8}$ may be required to allocate the user account $50_{A1}$. Such a determination can be based on factors including, but not limited to, the resource allocation request, characteristics associated with the consumer 20 (e.g., typical disk usage, network connection speed), dependencies between the resources 25, and the capacities of the resources 25. By way of illustration, the user account $50_{A1}$ may require a first amount of disk space. Such first amount of disk space may be available through the resource $25_{A1}$. The user account $50_{A1}$ may also require a first amount of processor time. The first amount of processor time may be available through a parallel processing machine that employs resource $25_{A2}$, which in turn requires that resources $25_{A7}$ and $25_{A8}$ be allocated. For example, the parallel processing resource $25_{A2}$ may require the data communication channels $25_{A7}$ and $25_{A8}$ to operate in its parallel processing mode. Although one resource allocator 30 is illustrated, it is to be appreciated that the present invention may employ more than one resource allocator 30. The resource request manager 40, after receiving a resource allocation request, may select one or more resource allocators to employ in allocating resources. By way of illustration, requests associated with disk drive capacity allocation may be forwarded to a first resource allocator 30 while requests associated with network bandwidth may be forwarded to a second resource allocator 30.

The consumer 20 can also cause a second resource allocation request to be forwarded to the resource request manager 40. The resource request manager 40 can similarly pass the second resource allocation request to the resource allocator 30, which will attempt to allocate the resources 25 requested in the resource allocation request generated by the consumer 20. By way of illustration, the consumer 20 may make cause a second resource allocation request to be generated in associating with establishing a user email account $50_{A2}$. The user email account $50_{A2}$ can be considered a resource to be allocated to the consumer 20. The present invention can determine that in order to allocate the user account $50_{A2}$ to the consumer 20, that other resources 25 are required. For example, the resources $25_{A3}$ and $25_{A4}$ may be required to allocate the user account $50_{A2}$. Such a determination can be based on factors including, but not limited to, the resource allocation request, characteristics associated with the consumer 20 (e.g., user accounts already allocated, resources already allocated), dependencies between the resources 25 and the capacities of the resources 25. By way of illustration, the user account $50_{A2}$ may require a second amount of disk space. Such second amount of disk space may be available through the resource $25_{A3}$. The user account $50_{A2}$ may also require a second amount of processor time. The second amount of processor time may be available through a machine that employs resource $25_{A4}$. The second request may be handled, for example, in parallel or serially with respect to the first request. It is to be appreciated that the second request may also be related to the first request (e.g., consumer requires disk capacity and network bandwidth).

While three user accounts 50 are illustrated in connection with FIG. 2, it is to be appreciated that a greater or lesser number of resources (e.g., accounts) can be allocated in accordance with the present invention. Similarly, while ten resources $25_{A1}$ through $25_{A10}$ are illustrated in association with FIG. 2, it is to be appreciated that a greater or lesser number of resources (e.g., processors, disk space) can be allocated in accordance with the present invention.

Figure 3:
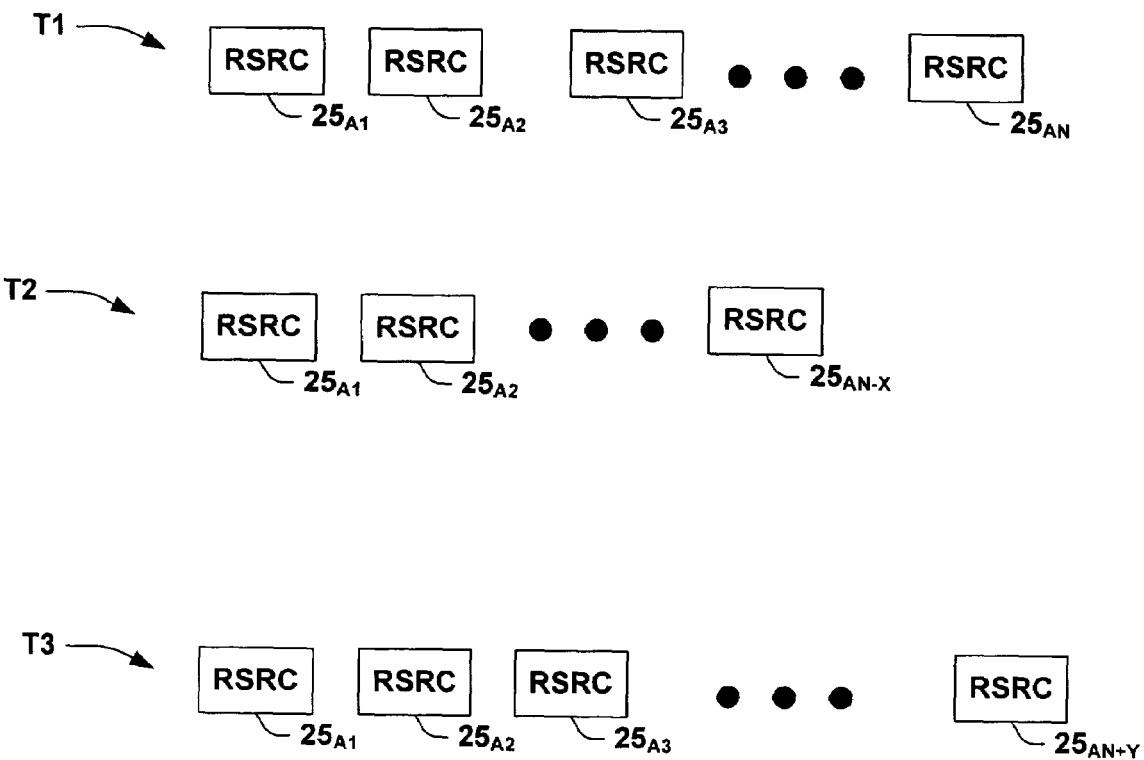
FIG. 3 is a timing diagram illustrating a resource pool changing over time, in accordance with an aspect of the present invention.
Figure 4:
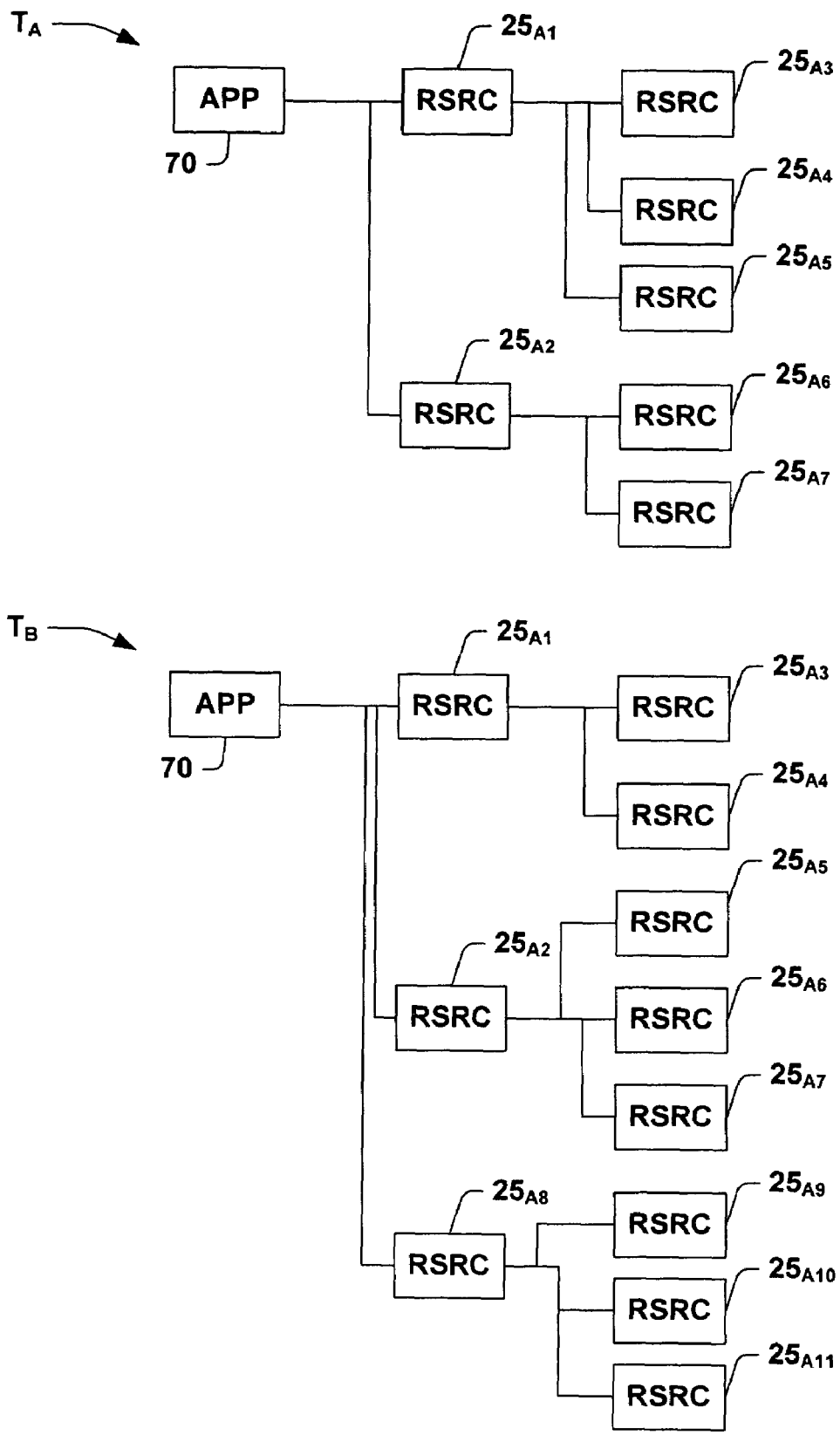
FIG. 4 is a timing diagram illustrating resource dependencies changing over time, in accordance with an aspect of the present invention.
Figure 5:
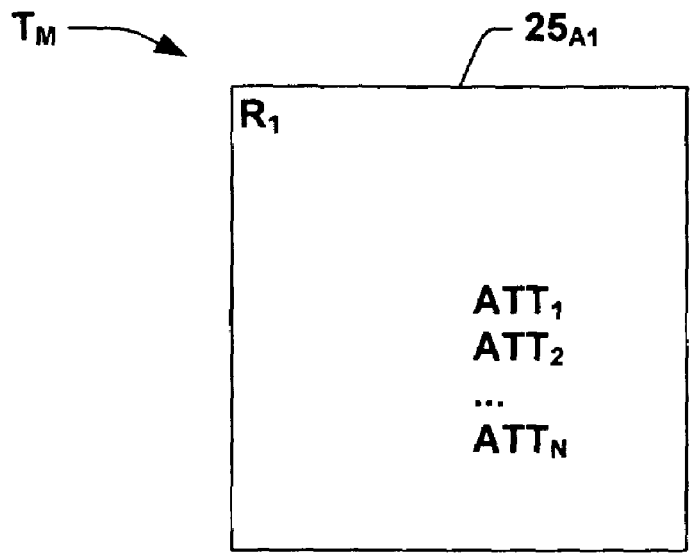
FIG. 5 is a timing diagram illustrating a resource changing over time, in accordance with an aspect of the present invention.
Figure 5:
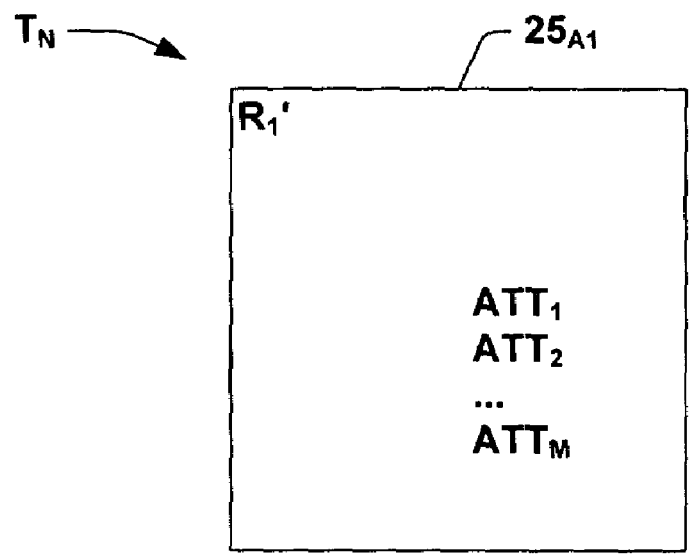

Turning now to FIG. 3, a timing diagram illustrating the dynamic nature of a pool of resources 25 available to be allocated is provided. Allocating the resources 25 is complicated because the resources 25 available to be allocated may change. For example, the number of resources available may grow or diminish. Further, as illustrated in FIG. 4 the dependencies between resources can change and as illustrated in FIG. 5 the characteristics of the resources can change. Such changes increase the complexity in allocating resources. Conventional process driven systems may not be able to respond to such changes and thus provide inadequate resource allocation performance as compared to the present data driven invention.

At a first time T1, the pool of available resources can include resources $25_{A1}$ through $25_{AN}$. But at a second time T2, X resources, X being an integer, may have been removed from the pool, and thus the pool of available resources can include resources $25_{A1}$ through $25_{AN-X}$. And at a third time T3, Y resources, Y being an integer, may have been added to the pool, and thus the pool of available resources can include resources $25_{A1}$ through $25_{AN+Y}$. Since, the pool of available resources can change, static rules and/or algorithms for resource allocation may become obsolete and lead to unsatisfactory resource allocation. Thus, the present invention provides for updating resource instance information to more accurately reflect the pool of resources 25 available at a point in time. By way of illustration, a resource instance table can hold information concerning resources 25 that are available to be allocated. The resource instance table can hold information including, but not limited to, the name of a resource, the address of a resource, pointers to resources upon which the resource is dependent, a pointer to metadata concerning the resource, and usage information concerning the resource. The resource instance table can be updated as resources become available or as they become unavailable. Further, the resource instance table can be updated to reflect changes in usage information concerning the resource. By way of illustration, the resource instance table could have a record describing a disk named DISK A, located at address 123.456.789.123, which is dependent upon a processor P1, that is being utilized at twenty five percent of its capacity, and which is associated with an object O1 located at address 0x FFFF:FFFF, the object holding metadata concerning DISK A.

Turning now to FIG. 4, a timing diagram illustrates resource dependencies changing over time. Such changes can complicate resource allocation. At a time $T_A$, an application 70 may depend, for example, on two resources $25_{A1}$ and $25_{A2}$. By way of illustration, an email application may depend on having disk space and data communications available. The resource $25_{A1}$ may in turn depend on three resources $25_{A3}$, $25_{A4}$ and $25_{A5}$, for example. By way of further illustration, the disk space resource upon which the example email application depended may in turn depend on a disk controller, a secondary disk space, and a backup disk space. The resource $25_{A2}$ can in turn depend on two resources $25_{A6}$ and $25_{A7}$, for example. By way of further illustration, the data communications resource upon which the example email application depended may in turn depend on a communications server and a data line. But dependencies between applications and resources may not be static.

For example, at a time $T_B$, the application 70 may depend, for example, on three resources $25_{A1}$, $25_{A2}$, and $25_{A8}$. By way of illustration, an email application may depend on having disk space, data communications, and security protection available. The resource $25_{A1}$ may in turn depend on three resources $25_{A3}$, $25_{A4}$ and $25_{A5}$, for example. By way of further illustration, the disk space resource upon which the example email application depended may in turn depend on a disk controller, a secondary disk space and a backup disk space. At point $T_B$, the resource $25_{A2}$ can depend on three resources, $25_{A5}$, $25_{A6}$ and $25_{A7}$ rather than the two resources $25_{A6}$ and $25_{A7}$, upon which it previously relied. By way of further illustration, the data communications resource upon which the example email application depended may in turn depend on a communications server, an incoming data line and an outgoing data line. The application 70 may also depend on a third resource $25_{A8}$, which in turn depends on three resources $25_{A9}$, $25_{A10}$ and $25_{A11}$. By way of illustration, a security firewall may depend on an electronic signature resource, an encryption resource and a decryption resource. By facilitating the definition of resources, including dependencies between resources, the present invention is more flexible than conventional allocation systems, thus mitigating problems associated with static rules, algorithms, and/or data structures employed in conventional systems. It is to be appreciated that although a limited number of resources and dependencies are illustrated in association with FIG. 4, that a greater or lesser number of resources and/or dependencies may be employed in accordance with the present invention.

Turning now to FIG. 5, a timing diagram illustrates a resource $25_{A1}$ changing over time. At a first point in time $T_M$, the resource $25_{A1}$ may be defined by a set of attributes $R_1$, which can include attributes one through X, X being an integer. But at a second point in time $T_N$, the resource $25_{A1}$ may be defined by a different set of attributes ($ATT_1$, $ATT_2$ through $ATT_Y$), $R_{1'}$, which can include attributes one through Y, Y being an integer. The changes in the attributes can include, but are not limited to, the number of attributes (e.g., from X to Y), the individual attributes (e.g., disk space changes from ten Mb to five Mb) and the type of attributes (e.g., fixed records to dynamic records). By facilitating the definition of resources, including the attributes by which a resource can be defined, the present invention is more flexible than conventional allocation systems, thus mitigating problems associated with static definitions employed in conventional systems. It is to be appreciated that although X and Y attributes are illustrated in FIG. 5, that any suitable number of attributes can be employed in accordance with the present invention.

Figure 6:
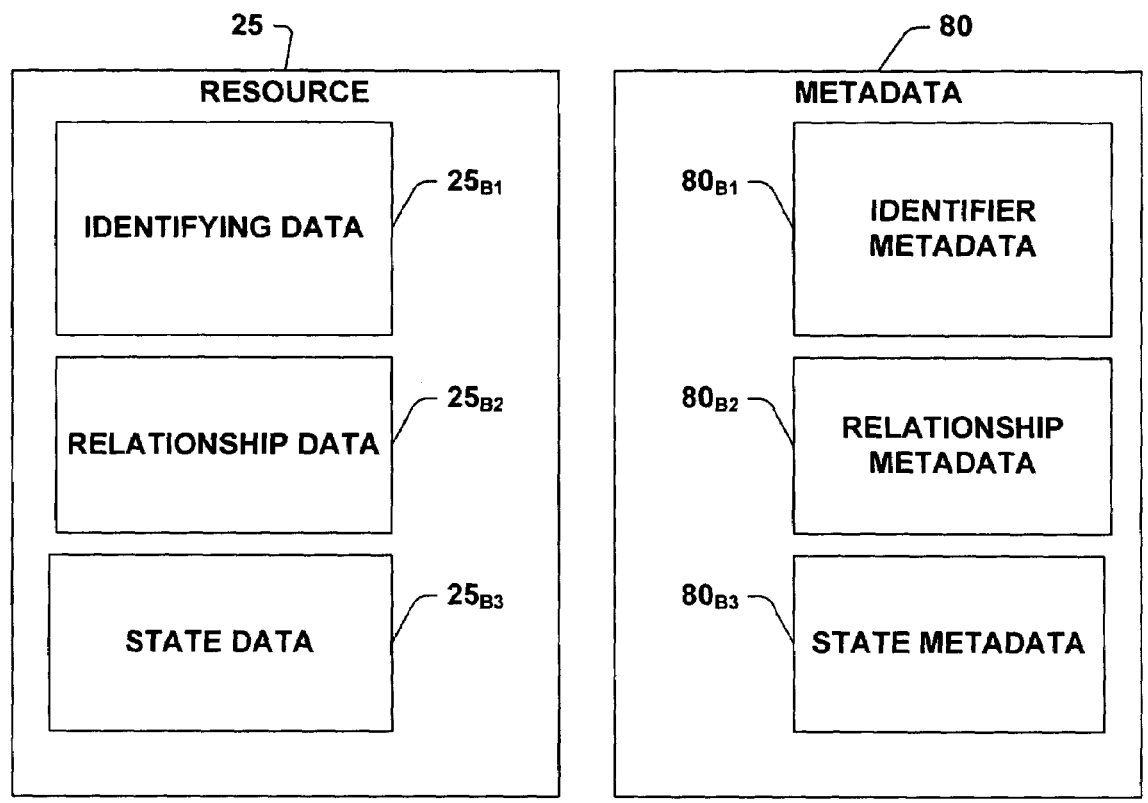
FIG. 6 is a schematic block diagram illustrating a data structure characterizing a resource, and metadata associated with the resource.

Turning now to FIG. 6, a schematic block diagram illustrates a data structure 80 containing metadata associated with a resource 25. The resource 25 can include data including, but not limited to, identifying data $25_{B1}$, relationship data $25_{B2}$ and state data $25_{B3}$. The identifying data $25_{B1}$ can include, but is not limited to, a resource name and a resource size. For example, the resource 25 may be named DISKA with a size of one hundred gigabytes (Gb). The relationship data $25_{B2}$ can include, but is not limited to, dependencies between the resource 25 and other resources. Allocating the example DISKA may depend on allocating a hard disk controller, a secondary disk and a backup disk, for example. The state data $25_{B3}$ can include, but is not limited to, whether the disk is online, the percent capacity at which the disk is operating and a list of allocated disk sectors. Thus, the identifying data $25_{B1}$, the relationship data $25_{B2}$ and the state data $25_{B3}$ can be employed to describe an instance of a resource.

The metadata 80 can be employed to more generally describe a resource by, for example, describing the identifying data $25_{B1}$, describing the relationship data $25_{B2}$ and describing the state data $25_{B3}$. The identifier metadata $80_{B1}$ can be employed to describe the identifying fields in the identifying data $25_{B1}$. For example, a first field in the identifier metadata $80_{B1}$ can describe the name field (e.g., character data, n characters available, null terminated). Similarly, fields in the relationship metadata $80_{B2}$ can describe how a relationship is recorded (e.g., parent resource name, parent resource type, child resource name, child resource type). Further, the state metadata $80_{B3}$ can be employed to describe the state data $25_{B3}$ in the resource 25. For example, a first field in the state metadata $80_{B3}$ can describe a field for recording whether the resource 25 is online. By providing for defining, using and updating metadata concerning resources, the present invention provides means for flexibly defining and updating resources, overcoming problems associated with static definitions in conventional systems.

Figure 7:
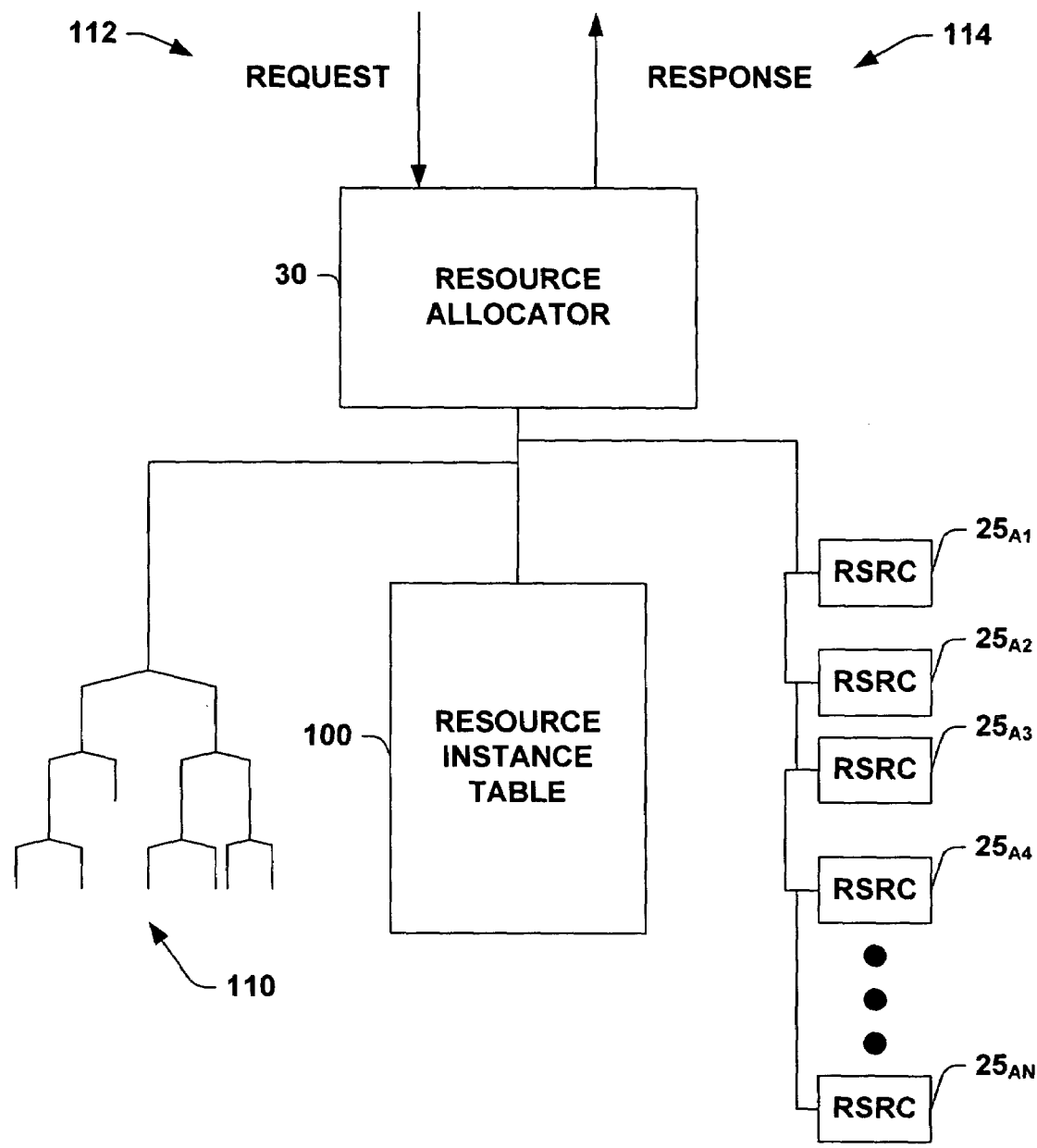
FIG. 7 illustrates a resource allocator examining a dependency tree, a resource instance table and resources while processing a resource allocation request, in accordance with an aspect of the present invention.

Turning now to FIG. 7, components accessed while processing a resource allocation request 112 are illustrated. Although FIG. 7 and other figures illustrate one method for initiating automatic and dynamic resource allocation through presenting a request to the present invention, it is to be appreciated that other resource allocation initiating events may also trigger the resource allocation. By way of illustration, a process may store desired resource information in a record and generate an interrupt. An interrupt service routine may handle the interrupt and cause the present invention to allocate resources. By way of further illustration, a thread may set one or more bit flags indicating resource requirements and then generate a signal. A signal handler may, in handling the signal, initiate processing in the present.

A resource allocation request 112 can be received by a resource allocator 30. The resource allocator 30 can examine at least one of a resource dependency tree 110, a resource instance table 100 and resource instances 25. After examining the resource dependency tree 110, the resource instance table 100 and the resource instances $25_{A1}$ through $25_{AN}$ (collectively the resources 25), the resource allocator 30 can generate a response 114 to the resource allocation request 112. The response can, for example, indicate that resources were, or were not allocated, and the identity and location of such resources. In an exemplary system, to determine whether resources 25 requested in the resource allocation request 112 can be allocated, the resource allocator may first examine the resource dependency tree 110. The resource dependency tree 110 can be employed to determine whether a request for a first resource carries a dependent request for one or more other resources. For example, a request for ten Mb of disk space may generate a request for a primary ten Mb allocation, and a dependent request for a secondary ten Mb allocation and a backup ten Mb allocation. Once the resource allocator 30 has resolved the dependent requests by accessing the dependency tree 110, the resource allocator 30 may examine the resource instance table 100 to determine which, if any, of the resources 25 are available to satisfy the resource allocation request 112. For example, having determined that the request 112 seeks a ten Mb allocation, and also requires a secondary ten Mb allocation and a ten Mb backup allocation, the resource instance table 100 can be examined to locate a primary disk resource, a secondary disk resource and a backup disk resource, each with ten Mb available. The resource instance table 100 may indicate that resources $25_{A1}$, $25_{A2}$, $25_{A3}$ and $25_{A4}$ are available for the allocation. Thus, the resource allocator 30 may examine the resources $25_{A1}$, $25_{A2}$, $25_{A3}$ and $25_{A4}$ to determine which three of the four eligible resources should be allocated in response to the request 112. The determination may consider issues including, but not limited to, the current operating capacity of the resources $25_{A1}$, $25_{A2}$, $25_{A3}$ and $25_{A4}$, the relative availability of the resources $25_{A1}$, $25_{A2}$, $25_{A3}$ and $25_{A4}$ compared to other resources, the current allocation status of the resources $25_{A1}$, $25_{A2}$, $25_{A3}$ and $25_{A4}$, affinities between the resources $25_{A1}$, $25_{A2}$, $25_{A3}$ and $25_{A4}$, and affinities between the available resources and other resources allocated to the consumer. Although three entities (the resource dependency tree 110, the resource instance table 100 and one or more resources 25) are illustrated in association with FIG. 7, it is to be appreciated that a greater or lesser number of entities can be examined by the resource allocator 30 in accordance with the present invention.

Figure 8:
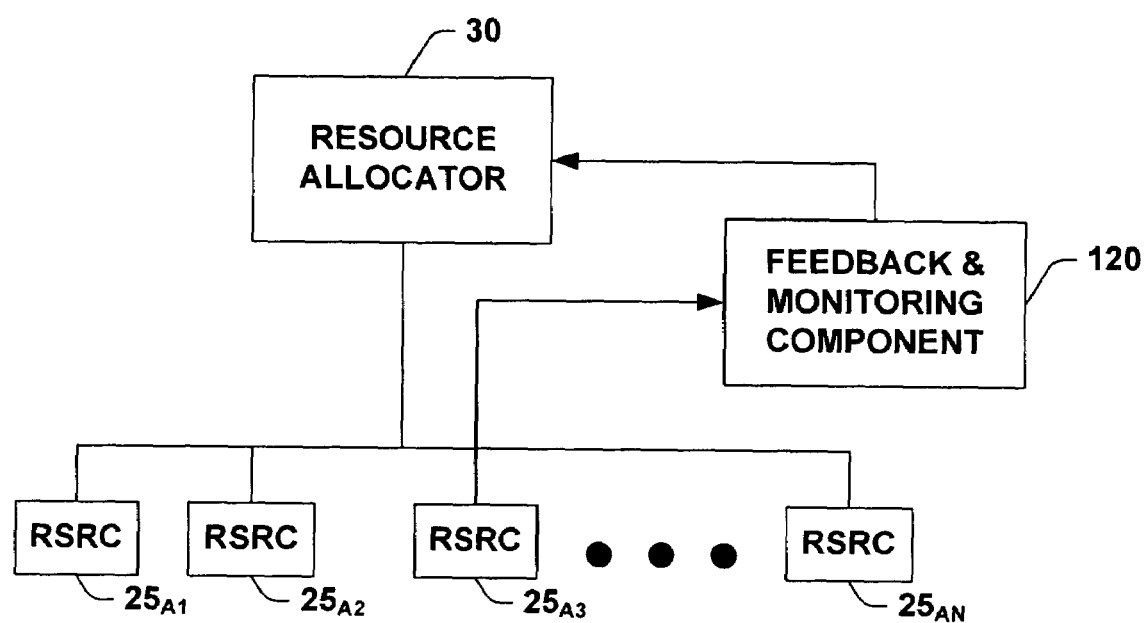
FIG. 8 is a schematic block diagram illustrating a feedback and monitoring component monitoring resources and feeding back information concerning the resources to a resource allocator, in accordance with an aspect of the present invention.

Turning now to FIG. 8, a schematic block diagram illustrates a feedback and monitoring component 120 monitoring resources $25_{A1}$ through $25_{AN}$ (collectively the resources 25) and generating feed back information concerning the resources 25 to the resource allocator 30. As will be illustrated in FIG. 10, the feedback information may be routed to other components as well. The feedback and monitoring component 120 can be monitoring properties including, but not limited to, actual usage of the resources 25, interactions between the resources 25, allocation status of the resources 25, maintenance status of the resources 25, load balances between the resources 25 and predicted usage of the resources 25. Information concerning the monitored properties can be fed back to the resource allocator 30, which can then selectively take actions based on the information fed back. For example, if the feedback and monitoring component 120 monitors a resource $25_{A1}$ operating at ninety-five percent of its capacity, while a resource $25_{A2}$, which can provide substantially the same resources, is operating at five percent of its capacity, then the resource allocator may direct subsequent resource requests to the resource $25_{A2}$, and may also shift some of the load from the resource $25_{A1}$ to the resource $25_{A2}$. It is to be appreciated that although load balancing and request targeting are described in association with actions taken by the resource allocator 30 in response to information fed back from the feedback and monitoring component 120, that other actions may be taken by the resource allocator in response to the information fed back. Monitoring the resources 25 via the feedback and monitoring component 120 facilitates updating items including, but not limited to, resource allocation rules, the resource instance table 100 (FIG. 7) and the resource dependency tree 110 (FIG. 7). Such updating improves the responsiveness of the system 10 (FIG. 1) for automatically and dynamically allocating resources, mitigating problems associated with static allocation methods found in conventional systems.

While the feedback and monitoring component 120 is described in FIG. 8 as generating feedback information, in an alternative example of the present invention, the feedback and monitoring component may receive feedback information from the resources 25 and/or from an outside feedback information generator (not illustrated) and forward such information to the resource allocator 30.

Figure 9:
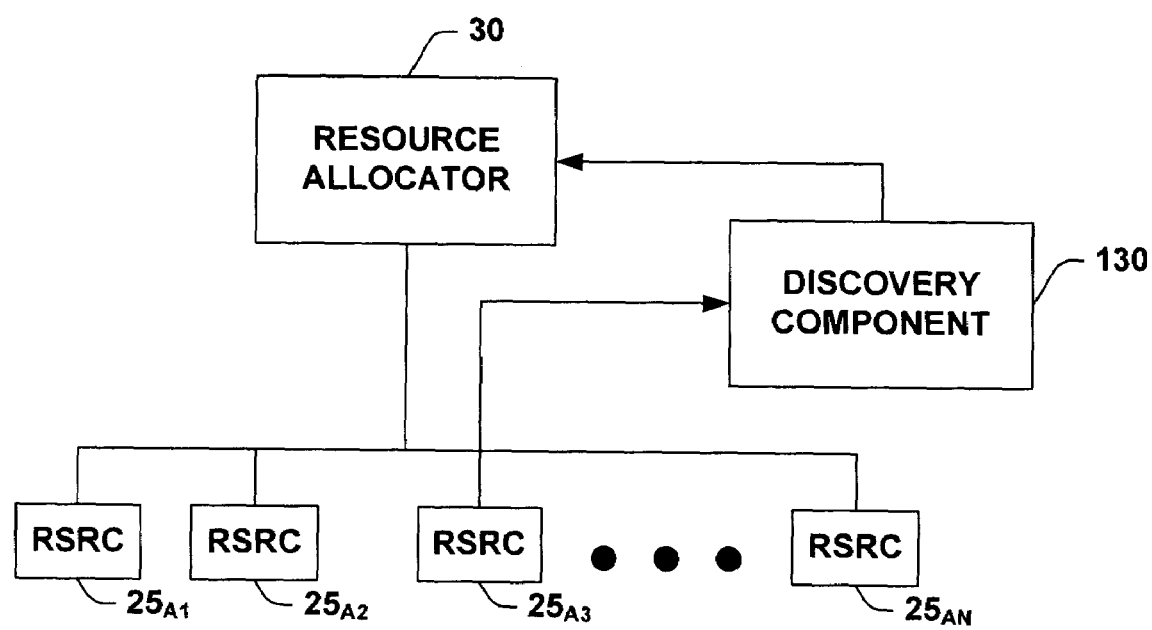
FIG. 9 is a schematic block diagram illustrating a discovery component monitoring resources and feeding back information concerning the resources to a resource allocator, in accordance with an aspect of the present invention.

Turning now to FIG. 9, a schematic block diagram illustrates a discovery component 130 monitoring resources $25_{A1}$ through $25_{AN}$ (collectively the resources 25) and feeding back information concerning the resources 25 to the resource allocator 30. The discovery component 130 can monitor the resources 25 to discover changes that occur among the resources 25. By way of illustration, if a resource $25_{A1}$ changes its capacity (e.g., from one hundred megabytes to five hundred megabytes), the discovery component 130 may discover this change and report the increased capacity to the resource allocator 30. Based at least in part on the discovery information, the resource allocator 30 may target new requests to the resource $25_{A1}$ and/or may shift loads between the resources to balance and/or optimize loads, for example. By way of further illustration, if a new resource is added to the resources 25 the discovery component 130 may discover this additional resource and report the presence of the additional resource to the resource allocator 30. Based at least in part on the discovery information, the resource allocator 30 may target new requests to the newly discovered resource or may shift loads to balance and/or optimize, as noted above. Providing the means to discover changes to the resources 25 (e.g., new capacities, new resources, new dependencies, new affinities) facilitates updating items including, but not limited to, resource allocation rules, the resource instance table 100 (FIG. 7) and the resource dependency tree 110 (FIG. 7). Such updating improves the responsiveness of the system 10 (FIG. 1) for automatically allocating resources, mitigating problems associated with static resource tables employed by static allocation methods found in conventional systems.

Figure 10:
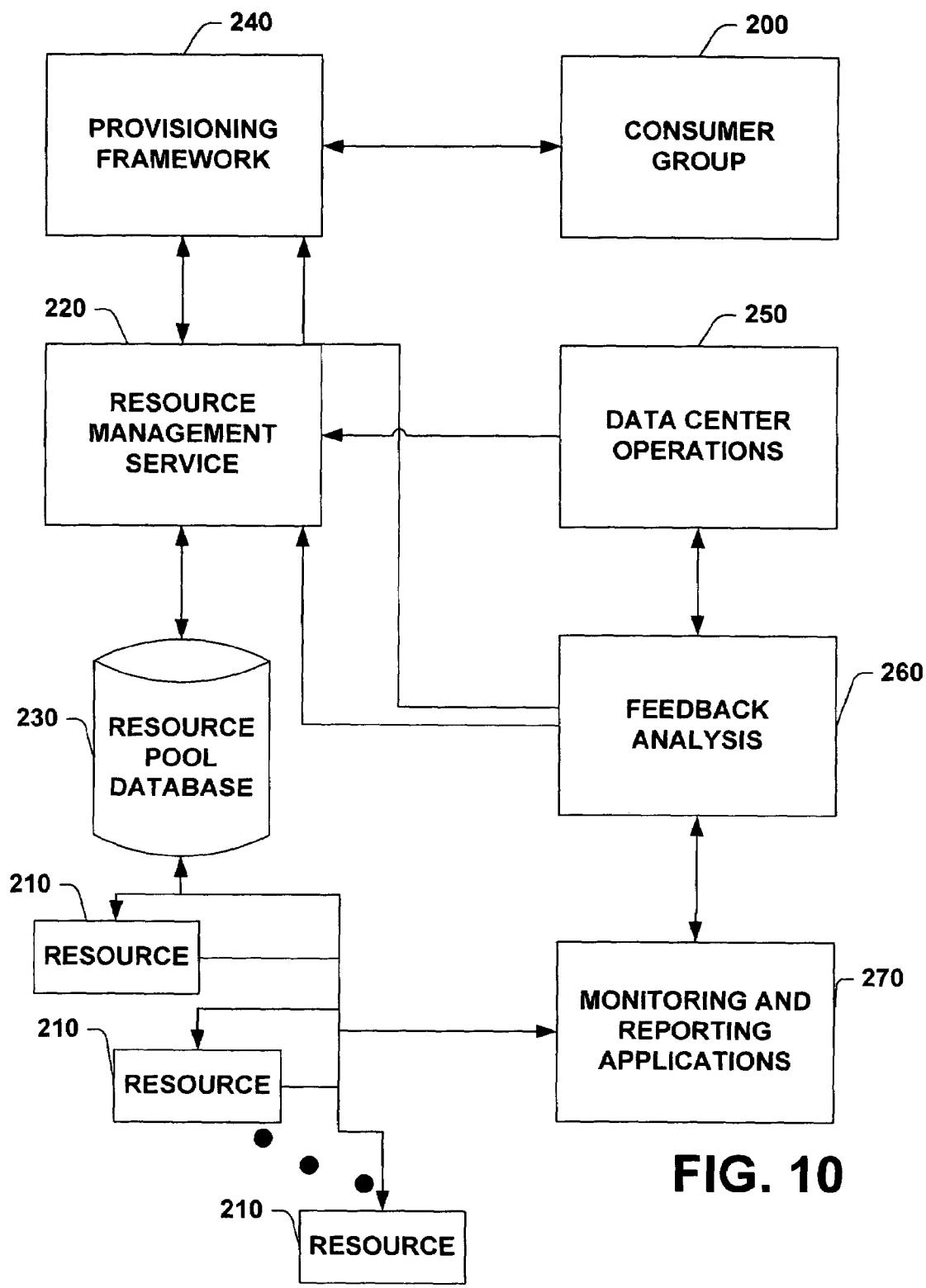
FIG. 10 is a schematic block diagram illustrating an exemplary operating environment for a system configured in accordance with an aspect of the present invention.

Turning now to FIG. 10, an exemplary environment for the present invention is illustrated. One or more individual members of a consumer group 200 may desire to perform one or more actions (e.g., access an email account). Furthermore, collective action may be contemplated for the consumer group 200 as a whole (e.g., system administrative actions). Such actions may require one or more resources 210 to be allocated to support processing associated with the actions desired by the consumer group 200. For example, the consumer group 200 may be a group of email application users who desire to access email accounts over the World Wide Web portion of the Internet (the Web). Thus, resources including, but are not limited to, disk space, data communications devices, processor cycles, and security devices, for example, may need to be allocated. Information concerning the resources 210 can be stored in a resource pool database 230. The resource pool database 230 can store information including, but not limited to, resource name, resource type, resource capacity, resource allocation status and resource security status, for example.

A provisioning framework 240 can be responsible for generating one or more resource allocation initiating events (e.g., requests for resources 210) based on the actions desired by one or more members of the consumer group 200 and or collective actions. For example, if members of the consumer group 200 desired to access email accounts over the Web, the provisioning framework 240 may generate requests for resources including, but not limited to, disk space, data communications devices, processor cycles and security devices, for example. The requests for resources can be sent from the provisioning framework 240 to a resource management service 220. The resource management service 220 can then access information concerning the resources 210, such information being stored in the resource pool database. For example, the resource management service 220 may access information including, but not limited to, information concerning dependencies between the resources 210, information concerning the allocation status of one or more resources 210, information concerning the security status of one or more resources 210, information concerning the capacity of one or more resources 210 and information concerning the load being handled by one or more resources 210, for example. Based at least in part on such information, the resource management service 220 may select one or more allocation rules and/or algorithms to determine which, if any, of the resources 210 should be allocated in response to the requests from the provisioning framework 240. It is to be appreciated that the allocation algorithms may themselves be specified as metadata. If resources 210 sufficient to satisfy the requests from the provisioning framework 240 are located, then the resource management service 220 can send a response to the service provisioning framework concerning the ability to allocate the requested resources 210 and/or which of the resources 210 have been allocated, for example.

Since the resources 210 are not static, being able to change in number, type, dependencies, affinities and characteristics, monitoring and reporting applications 270 can monitor the resources 210 and feedback information to a feedback analysis component 260. For example, the monitoring and reporting applications 270 can monitor properties including, but not limited to, the actual usage of the resources 210, relationships between the resources 210, load distribution between the resources 210 and scheduled maintenance of the resources 210. Based at least in part on information from the monitoring and reporting applications 270, the feedback analysis component 260 can feedback information to at least one of the resource management service 220, the provisioning framework 240 and a data center operations component 250.

Information fed back to provisioning framework 240 can be employed in actions including, but not limited to, generating new resource allocation initiating events, generating new resource allocation requests, generating resource reallocation requests, generating resource deallocation requests, updating resource allocation rules and/or algorithms, updating resource reallocation rules and/or algorithms and updating resource deallocation rules and/or algorithms. For example, if information fed back from the feedback analysis component 260 indicates that members of the consumer group 200 are consuming only ten percent of the resources requested to support processing associated with actions desired by members of the consumer group 200, then the provisioning framework 240 may generate events that initiate allocating allocate a different mix of resources 210 more optimally suited to service the actual usage of resources 210 associated with the processing desired by members of the consumer group 200.

Information fed back to the resource management service 220 can be employed in actions like generating new resource allocation rules and/or algorithms, for example. By way of illustration, information fed back from the feedback analysis component 260 may indicate that when a first resource 210 operates near capacity, that the performance of a second resource 210 degrades. Thus, the resource management service 220 may change resource allocation rules and/or algorithms to account for this observed phenomenon by, for example, pairing requests to allocate resources from the first resource 210 with requests to move load from the second resource 210 and generating requests to move load from the second resource 210 when allocating resources from the first resource 210.

The data center operations components 250 can be employed to change information concerning the resources 210 and/or to change resource allocation rules and/or algorithms, for example. By way of illustration, if a new resource 210 becomes available, an administrator may update the resource pool database 230 to reflect the availability of the new resource. Similarly, resource allocation rules and/or algorithms can be added, deleted and/or changed in data associated with the resource management service 220 from the data center operations component 250. For example, if a new memory storage device becomes available, then the data center operations component 250 can be employed to change memory allocation rules and/or algorithms, and the data center operations component 250 can also be employed to update the resource pool database 230 concerning the availability of the new memory storage device. Thus, information fed back from the feedback analysis component 260 can be employed to generate resource pool database 230 updates and/or resource management service updates 220, through the data center operations component 250. However, it is to be appreciated that changes need not pass through the data center operations component 250, and may pass directly to other components.

Figure 11:
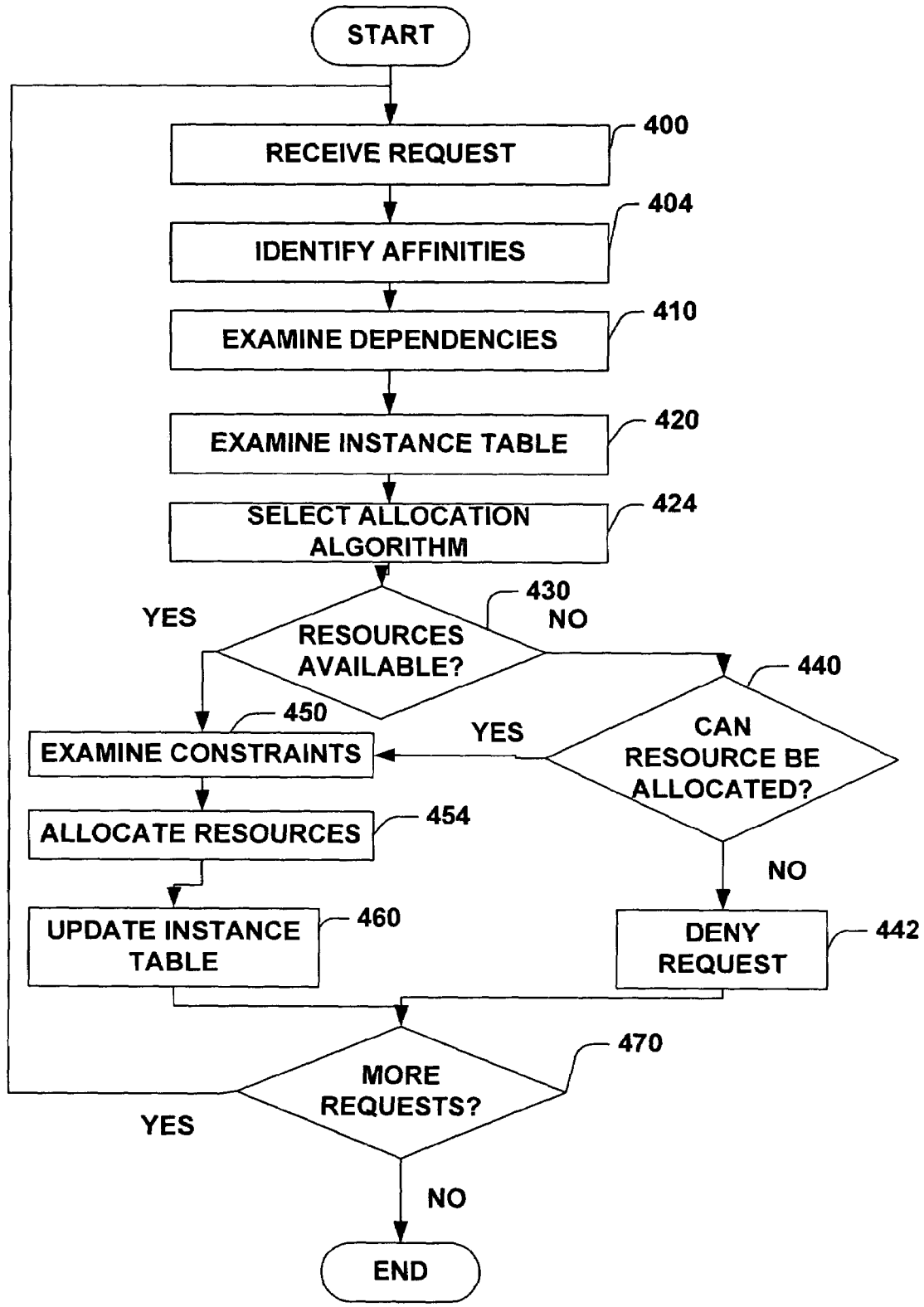
FIG. 11 is a flow chart illustrating a method for automatically and dynamically allocating resources, in accordance with an aspect of the present invention.
Figure 12:
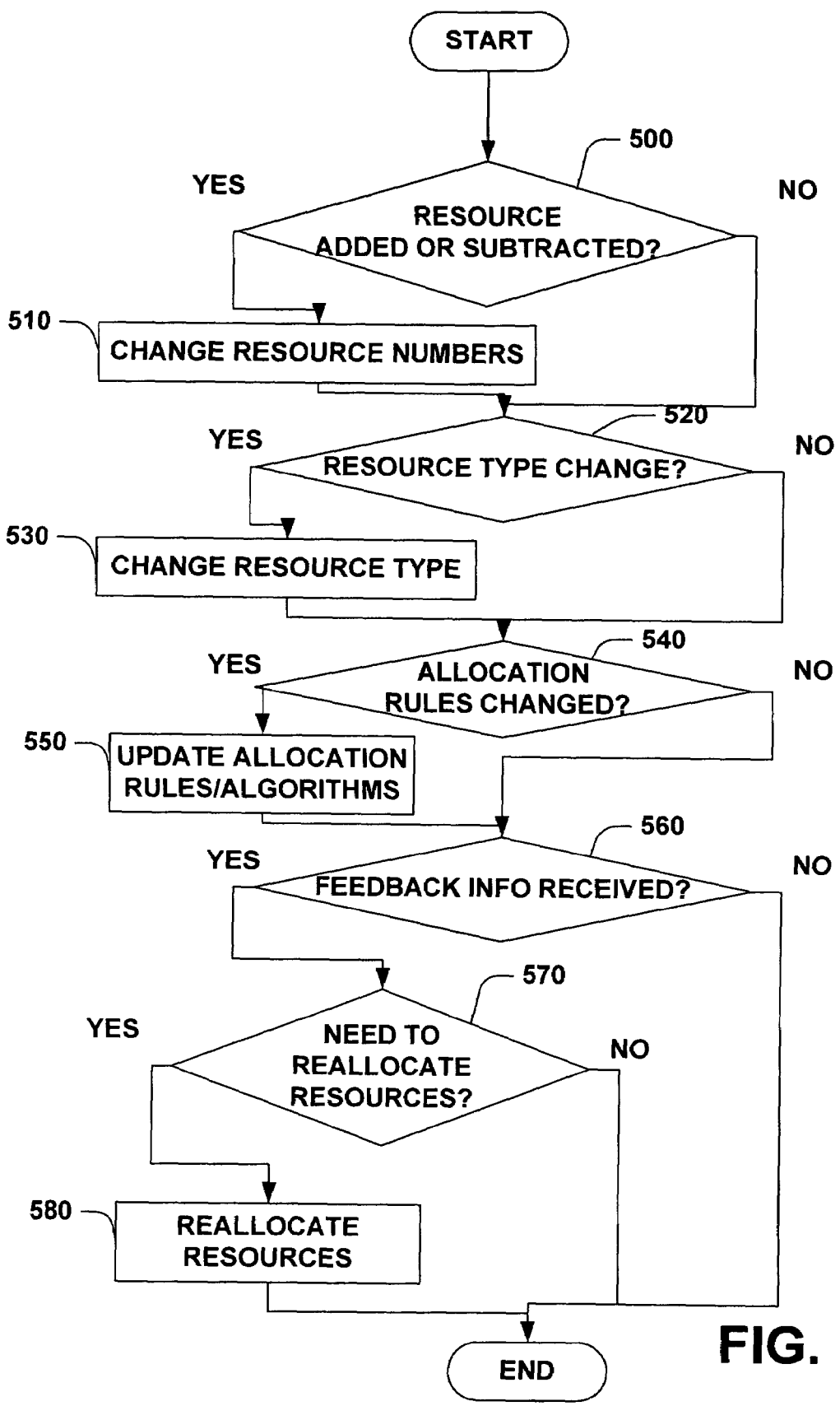
FIG. 12 is a flow chart illustrating a method for updating information associated with automatically and dynamically allocating resources, in accordance with an aspect of the present invention.
Figure 14:
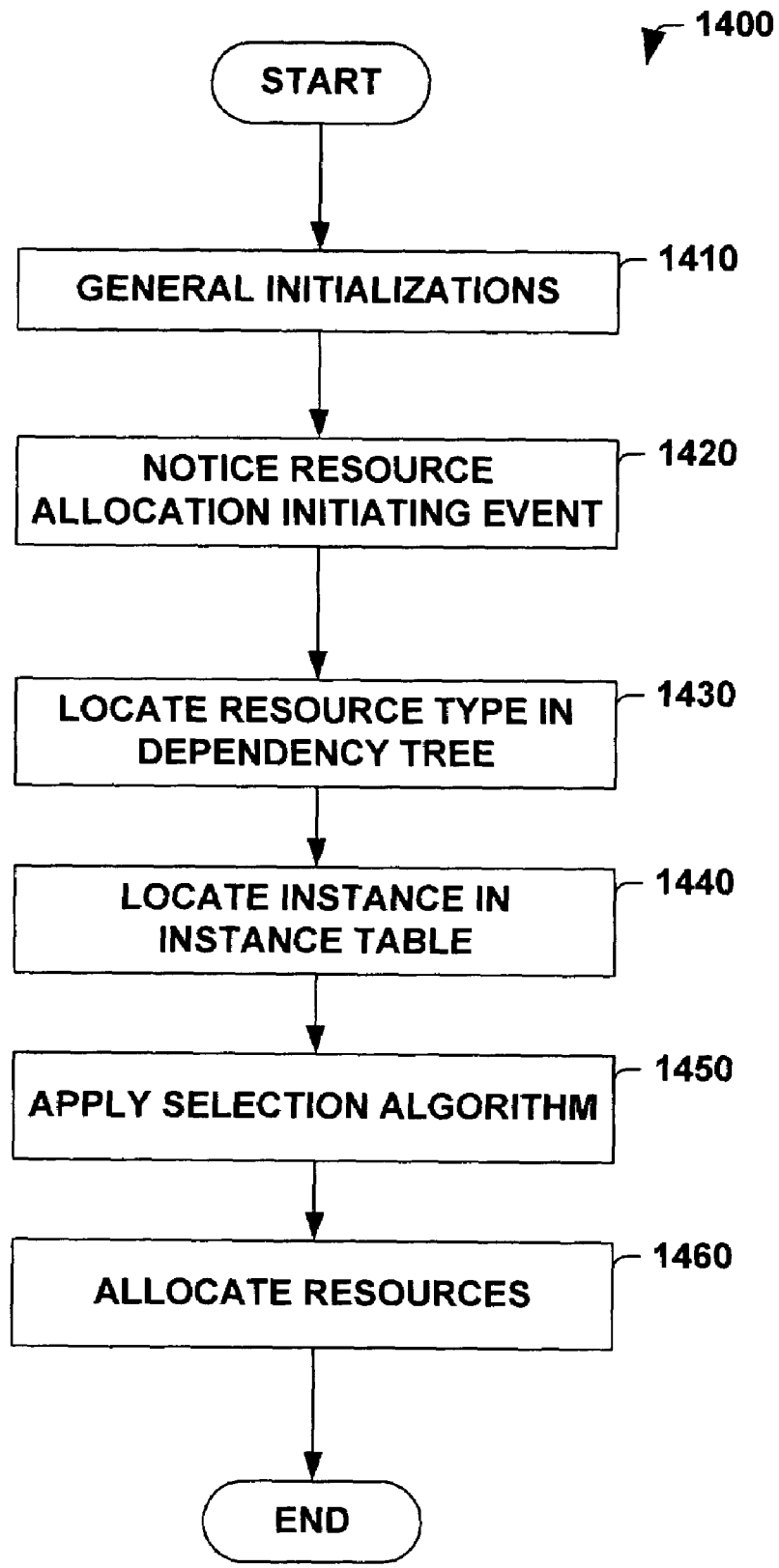
FIG. 14 is a flow chart illustrating a method for automatically and dynamically allocating resources, in accordance with an aspect of the present invention.

In view of the exemplary systems shown and described above, methodologies that may be implemented in accordance with the present invention will be better appreciated with reference to the flow diagrams of FIGS. 11, 12 and 14. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

Turning now to FIG. 11, a flow chart illustrates a method for automatically and dynamically allocating resources. At 400, a request for a resource is received. Although FIG. 11 illustrates a request being received at block 400 as one method for initiating automatic and dynamic resource allocation, it is to be appreciated that other resource allocation initiating events may also trigger the resource allocation. By way of illustration, a process may store desired resource information in a record and generate an interrupt. An interrupt service routine may handle the interrupt and cause the present invention to allocate resources. By way of further illustration, a thread may set one or more bit flags indicating resource requirements and then generate a signal. A signal handler may, in handling the signal, initiate processing in the present invention. At 404, affinities between resources can be identified. For example, for backup and security reasons a disk space allocation may require a primary disk allocation and a backup disk allocation. Transferring information from the primary disk to the backup disk may be required on a periodic basis (e.g., nightly). Information may be more easily transferred between certain pairs of disks, and information may be practically impossible to transfer between other pairs of disks. Thus, an affinity may be identified between disks between which data transfer is simple, and a constraint may be identified between disks between which data transfer is difficult. Identifying affinities and/or constraints can improve performance of applications provisioned by the present invention as compared to applications provisioned by conventional allocation methods.

At 410, dependency data can be examined to determine a set of resources to allocate, with such examination, in one exemplary aspect of the present invention, yielding a list of resources. For example, to allocate a data communications device, a communications security device may also have to be allocated. At 420, an instance table can be examined to determine which, if any resources, match the request received at 400, the affinities of 404 and the dependencies of 410. At 424, an allocation algorithm and/or rule can be selected to determine which of the resources identified in 420 are to be allocated. For example, a request for disk space may be handled by a disk space allocation algorithm while a request for data communications bandwidth may be handled by a bandwidth allocation rule. By way of further illustration, different resource allocation algorithms can be employed for different resources. It is to be appreciated that such allocation algorithms can include, but are not limited to, an algorithm that selects the requested resource from a resource server, the resource server serving the least utilized resource; an algorithm that balances loads between one or more resource servers; an algorithm that selects the requested resource from a resource server, the resource server serving the most utilized resource; an algorithm that selects the requested resource from a resource server, the resource server serving having a resource capacity closest to the requested resource; an algorithm that selects the requested resource from a resource server, the resource server being the first resource server found that has the requested resource capacity available, and an algorithm that selects the requested resource from resource server, the resource server being the last resource server found that has the requested resource capacity available. Allocation algorithms may be selected, at least in part, by examining metadata associated with the instance resource.

At 430, the algorithm and/or rule can be employed to determine which, if any resources identified at 420 are available to be allocated. If the determination at 430 is NO, that resources sufficient to satisfy the request received at 400, the affinities of 404 and the dependencies of 410 are not available, then a subsequent determination can be made at 440. At 440, a determination can be made concerning whether the resources, even though not available, can be allocated. If the determination at 440 is NO, then the request can be denied at 442. Otherwise processing can continue at 450. An example of logic behind the determination at 440 relies on just in time delivery of resources. For example, if twenty resources are required to satisfy the request of 400, the affinities of 404 and the dependencies of 410, but one of the twenty resources is not currently available, the request may still be serviced. By way of illustration, if the resource required that is not available is a resource that is used frequently, for short periods of time, by numerous different devices, it is likely that the resource will not be available during the allocation phase of the method, but it is also likely that the resource will become available on an as-needed basis, or after a short delay in processing. Thus, the request to acquire the other resources should not suffer because one frequently allocated and de-allocated resource is not available.

If the determination at 440 is YES, or the determination at 430 is YES, that resources sufficient to satisfy the request received at 400, the affinities of 404 and the dependencies of 410 are available, or the current unavailability should not compromise the entire request, then at 450 constraints concerning the available resources can be examined. By way of illustration, an available resource may be scheduled for down time maintenance and thus should not be allocated. By way of further illustration, as discussed above, transferring data between a primary disk and a secondary disk may be practically impossible, so the pair of disks should not be allocated together, which is a constraint on the allocation. Thus, at 454, resources that are not constrained by other resources can be allocated. At 460, an instance table holding information concerning the resource instances can be updated to reflect the allocation of 454.

At 470, a determination is made concerning whether more requests are to be processed. If the determination at 470 is YES, then processing returns to 400, otherwise, processing concludes. By examining affinities, dependencies and constraints, the performance of applications for which resources are allocated by the present invention can be improved over the performance of applications for which resources are allocated by conventional methods.

Turning now to FIG. 12, a flow chart illustrates a method for updating resource allocations, resource definitions and resource allocation rules. By providing a method to update the allocations, definitions, and allocation rules and/or algorithms, problems associated with conventional methods can be mitigated. At 500, a determination is made concerning whether a resource has been added to or subtracted from the pool of available resources. If the determination at 500 is YES, then at 510, numbers stored concerning the available resources can be updated. At 520, a determination is made concerning whether one or more resources have changed type. If the determination at 520 is YES, then at 530, information concerning the resource type can be changed. At 540, a determination is made concerning whether one or more allocation rules and/or algorithms have changed. If the determination at 540 is YES, then at 550, the allocation rules and/or algorithms can be updated. At 560, a determination is made concerning whether feedback information has been received. If the determination at 560 is YES, then at 570, a determination is made concerning whether the feedback information indicates that resources should be reallocated. For example, if a first resource is operating at one hundred percent of capacity and a second and third resource capable of providing substantially the same resource are operating at ten percent of capacity, then, overall performance of applications supported by the resources may benefit from balancing the load between the resources. Thus, if the determination at 570 is YES, then at 580, the resources may be reallocated. In an exemplary aspect of the present invention, reallocation may be indicated by changes in the allocation rules, allocation algorithms and/or feedback information.

Figure 13:
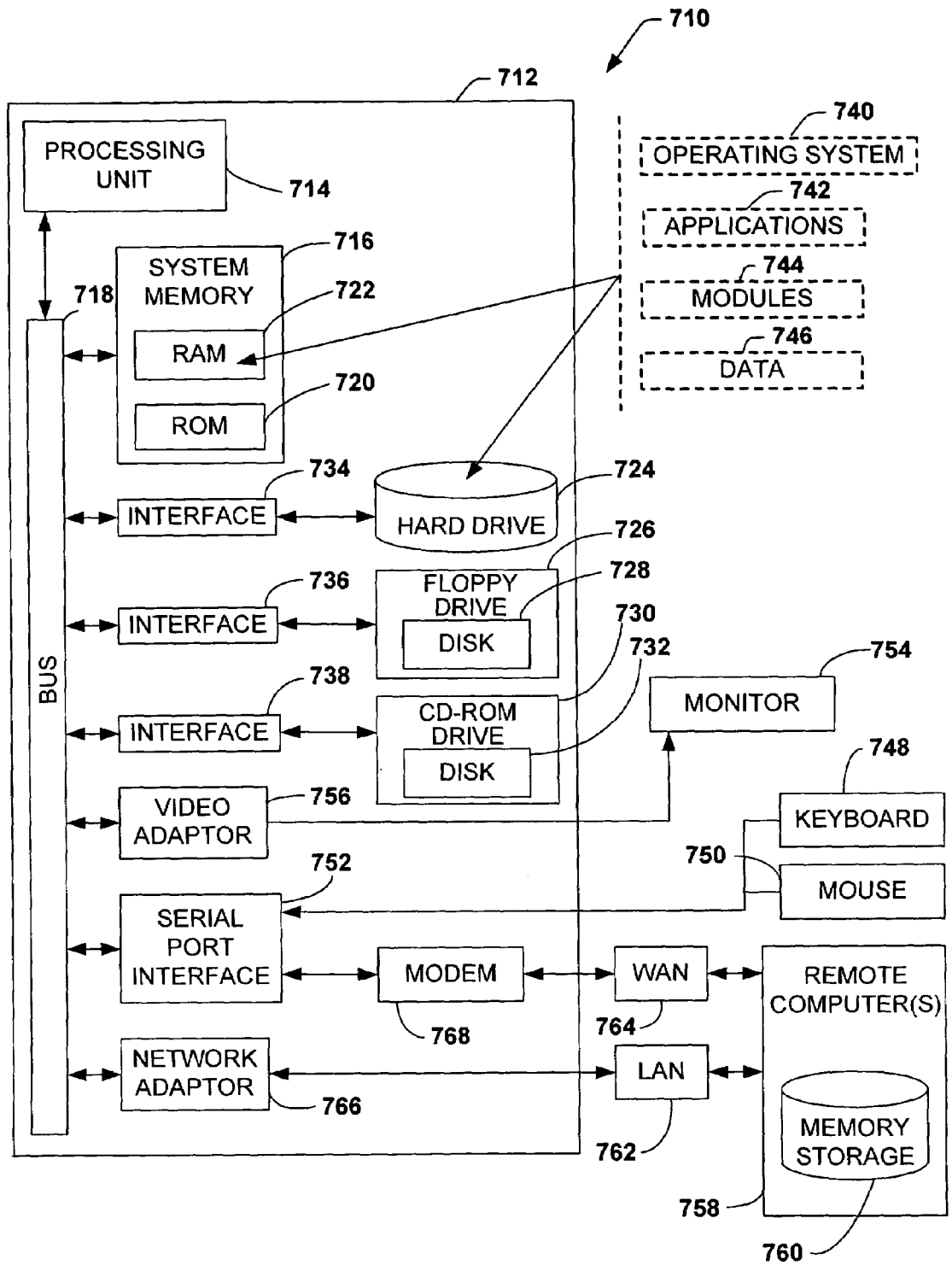
FIG. 13 is a schematic block diagram of an exemplary operating environment for a system configured in accordance with the present invention.

In order to provide additional context for various aspects of the present invention, FIG. 13 and the following discussion are intended to provide a brief, general description of one possible suitable computing environment 710 in which the various aspects of the present invention may be implemented. It is to be appreciated that the computing environment 710 is but one possible computing environment and is not intended to limit the computing environments with which the present invention can be employed. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 13 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 13, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors. Dual microprocessors and other multi-processor architectures also can be used as the processing unit 714.

The system bus 718 may be any of several types of bus structure including a memory bus or memory controller, a peripheral bus, and a local bus using any of a variety of commercially available bus architectures. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program non-interrupt data 746. The operating system 740 in the illustrated computer can be any of a number of commercially available operating systems.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754, or other type of display device, is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance, a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

Turning now to FIG. 14, a flow chart illustrates one example methodology 1400 for automatically and dynamically allocating resources. At 1410, general initializations occur. Such initializations can include, but are not limited to, allocating memory, establishing pointers, establishing data communications, initializing variables, initializing data structures and instantiating objects. At 1420, a resource allocation initializing event is noticed. Such events can include, but are not limited to, a resource allocation request, an interrupt associated with resource allocation, a signal associated with resource allocation and receiving a data communication packet. Resource allocation data may be associated with the resource allocation initializing event (e.g., list of desired resources).

At 1430, one or more resource types are located in a dependency tree. The resource types that are searched for are based, at least in part, on the resource allocation data associated with the resource allocation initializing event. At 1440, one or more available resource instances are located in an instance table, where the resource instances to search for are based, at least in part, on the resource allocation data associated with the resource allocation initializing event. At 1450, a selection algorithm is applied to choose among the available instances located in 1440 and at 1460, one or more available instances are allocated. Allocating the one or more available resources can include, but is not limited to, updating data associated with the resource to be allocated (e.g., instance, type, characteristic, metadata). Before the resource is allocated, the resource may be marked (e.g., data associated with the resource updated).

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for automatically and dynamically allocating resources, comprising:
   one or more allocating components that cooperate to automatically allocate one or more resources, the one or more allocating components determines whether the one or more resources are available for allocation based at least in part on examination of at least one of a resource dependency tree, a resource instance table, resource instances and data associated with the one or more resources, the data including at least one of type data, instance data and modifiable metadata, where at least one of the type data, instance data and modifiable metadata are dynamically modifiable;
   one or more storing components that stores data associated with the one or more resources, the data including at least one of type data, instance data and dynamically modifiable metadata, and where data is stored via the one or more storing components until an allocation recluest is received from the one or more allocating components to retrieve the stored data; and
   a monitoring component that monitors usage of the one or more resources, interactions between the resources, allocation status of the resources, maintenance status of the resources, load balances between the resources and predicted usage of the resources.

2. The system of claim 1, further comprising an Application Programming Interface (API) that configures and/or controls the one or more components for automatically allocating the one or more resources.

3. The system of claim 1, wherein the type data includes at least one of resource identifying data and resource characteristic data.

4. The system of claim 1, wherein the instance data includes at least one of an instance identifier, availability status, capacity information, allocation statistics, grouping information and dependency on another instance.

5. The system of claim 1, wherein the metadata is dynamically modifiable and includes at least one of data concerning the instance data, data concerning the type data, dependency relationships between services and resources, dependency relationships between resources and resources and constraint information indicating undesired relationships and preference information indicating affinity relationships.

6. The system of claim 1, wherein the monitoring component performs at least one of accepting feedback data concerning usage of the one or more resources and producing feedback data concerning usage of the one or more resources.

7. The system of claim 6, further comprising a reallocating component that reallocates usage of one or more resources, based at least in part on the feedback data concerning usage of the one or more resources.

8. The system of claim 7, further comprising a discovery component that discovers resources, the discovery component produces discovery data when at least one of a new resource is discovered, the number of resources changes and the type of one or more resources changes.

9. The system of claim 8, further comprising an Application Programming Interface (API) that facilitates manually allocating one or more resources.

10. The system of claim 9, further comprising:
an updating component that dynamically updates data concerning a resource, wherein updating the data includes one of adding new resource data, changing existing resource data and removing existing resource data, and where changing existing resource data includes one of changing a resource type, changing a resource characteristic, changing resource relationship data and changing resource dependency data.

11. A method for automatically and dynamically allocating resources, comprising:
noticing a resource allocation initiating event, where the initiating event is associated with resource allocation information;
automatically allocating one or more resources, wherein the one or more resources are associated with at least one of type data, instance data, characteristic data and resource metadata and where it is determined whether the one or more resources are available for allocation based, at least in part on examining at least one of a resource dependency tree, a resource instance table, resource instances and at least one of the type data, instance data, characteristic data and resource metadata;
updating at least one of the type data, instance data, characteristic data and resource metadata in response to the automatic allocation;
monitoring usage of the one or more resources, interactions between the resources, allocation status of the resources, maintenance status of the resources, load balances between the resources and predicted usage of the resources; and
producing feedback data concerning usage of the one or more resources.

12. The method of claim 11, where the resource allocation initiating event is at least one of receiving a resource allocation request, receiving an interrupt and receiving a signal.

13. The method of claim 12, further comprising returning a reply related to a resource allocation request.

14. The method of claim 13, wherein the resources are allocated according to at least one of a provisioning algorithm and one or more allocation rules.

15. A system for automatically and dynamically allocating one or more resources, comprising:
means for noticing a resource allocation initiating event, where data associated with the resource allocation initiating event specifies one or more desired resources to be allocated;
means for storing information concerning one or more resources available to be allocated, the information including at least one of type data, instance data, characteristic data and metadata, and where the information is stored until a resource allocation initiating event occurs reguesting the stored information;
means for resolving one or more dependencies between the one or more available resources;
means for allocating one or more resources based, at least in part, on examining at least one of a resource dependency tree, a resource instance table and resource instances;
means for monitoring usage of the one or more resources, interactions between the resources, allocation status of the resources, maintenance status of the resources, load balances between the resources and predicted usage of the resources; and
means for producing feedback data concerning usage of the one or more resources.

16. The system of claim 15, further comprising means for resolving one or more affinities between the one or more available resources.

17. The system of claim 16 further comprising means for selecting an algorithm to allocate the one or more available resources.

18. The system of claim 17 further comprising means for selecting one or more chosen resources to allocate in response to the resource allocation requests.

19. The system of claim 18 further comprising means for allocating one or more chosen resources in response to the resource allocation request; and
means for updating the information concerning the one or more available resources, the.

20. A computer readable storage medium tangibly embodying a program of instruction executable by a machine for allocating resources by performing the steps of:
noticing a resource allocation initiating event, where the initiating event is associated with resource allocation information;
automatically allocating one or more resources, wherein the one or more resources are associated with at least one of type data, instance data, characteristic data and resource metadata and where it is determined whether the one or more resources are available for allocation based, at least in part on examining at least one of a resource dependency tree, a resource instance table, resource instances and at least one of the type data, instance data, characteristic data and resource metadata;
updating at least one of the type data, instance data, characteristic data and resource metadata in response to the automatic allocation;
monitoring usage of the one or more resources, interactions between the resources, allocation status of the resources, maintenance status of the resources, load balances between the resources and predicted usage of the resources; and
producing feedback data concerning usage of the one or more resources.

* * * * *